(12) United States Patent
Ji et al.

(10) Patent No.: US 11,537,147 B2
(45) Date of Patent: Dec. 27, 2022

(54) METHOD FOR POSITIONING TARGET IN BUILDING BASED ON ASSISTANCE OF TWO AIRCRAFT

(71) Applicant: Nanjing Dwing Aviation Technology Co., Ltd., Nanjing (CN)

(72) Inventors: Jiayin Ji, Nanjing (CN); Hong Ji, Nanjing (CN); Haimei Peng, Nanjing (CN)

(73) Assignee: NANJING DWING AVIATION TECHNOLOGY CO., LTD., Nanjing (CN)

( * ) Notice: Subject to any disclaimer, the term of this patent is extended or adjusted under 35 U.S.C. 154(b) by 0 days.

(21) Appl. No.: 17/566,719

(22) Filed: Dec. 31, 2021

(65) Prior Publication Data
US 2022/0326719 A1      Oct. 13, 2022

(30) Foreign Application Priority Data

Apr. 7, 2021   (CN) .......................... 202110370968.3

(51) Int. Cl.
*B64C 39/02* (2006.01)
*G05D 1/00* (2006.01)
(Continued)

(52) U.S. Cl.
CPC ........... *G05D 1/042* (2013.01); *B64C 39/024* (2013.01); *G05D 1/0808* (2013.01); *B64C 2201/024* (2013.01)

(58) Field of Classification Search
CPC ........ G05D 1/042; G05D 1/0808; G05D 1/00; B64C 39/024; B64C 2201/024; B64C 39/02
See application file for complete search history.

(56) References Cited

U.S. PATENT DOCUMENTS

| 3,274,829 A | * | 9/1966 | Fernandez | ............... G06G 7/78 |
| | | | | 73/178 R |
| 4,933,864 A | * | 6/1990 | Evans, Jr | ............. G05D 1/0253 |
| | | | | 318/587 |

(Continued)

FOREIGN PATENT DOCUMENTS

| CN | 106705936 A | 5/2017 |
| CN | 107289910 A | 10/2017 |

(Continued)

OTHER PUBLICATIONS

Zhou Kemin, et al., Method of Location and Attitude Estimation for Small Indoor UAV with Multiple Markers Computer Engineering and Applications, 2019, pp. 231-238, vol. 55, No. 22.

(Continued)

*Primary Examiner* — Yonel Beaulieu
(74) *Attorney, Agent, or Firm* — Bayramoglu Law Offices LLC

(57) ABSTRACT

A method for positioning a target in a building based on the assistance of two aircraft includes the following steps: allowing two aircraft with respective direction-finding devices to fly around a building, and sending a signal by a positioning tag carried by an indoor target; measuring projections of directions of the signal source on a horizontal plane respectively by the two aircraft, and indicating a position of the indoor target on the horizontal plane by an intersection of the two projections; and according to a difference between barometric pressures of the indoor target and the aircraft, obtaining an altitude of the target to further obtain position coordinates of the target. The method avoids deploying an indoor positioning base station, and improves the positioning accuracy, stability and anti-interference performance.

10 Claims, 1 Drawing Sheet

(51) Int. Cl.
  *G05D 1/04*    (2006.01)
  *G05D 1/08*    (2006.01)

(56) References Cited

U.S. PATENT DOCUMENTS

| | | | | |
|---|---|---|---|---|
| 5,063,777 A * | 11/1991 | Arethens | ............ | G01P 5/00 |
| | | | | 701/14 |
| 2013/0278631 A1* | 10/2013 | Border | ............ | G06Q 30/02 |
| | | | | 345/633 |
| 2018/0046177 A1 | 2/2018 | Hu | | |
| 2020/0039638 A1 | 2/2020 | Hunkel | | |

FOREIGN PATENT DOCUMENTS

| | | |
|---|---|---|
| CN | 108303099 A | 7/2018 |
| CN | 110332932 A | 10/2019 |

OTHER PUBLICATIONS

Wang Baorui, et al., Design of ShortWave Direction-Finding Processor Based on Wasson-Watt, Chinese Journal of Scientific Instrument, 2010, pp. 313-317, vol. 31, No. 8.

* cited by examiner

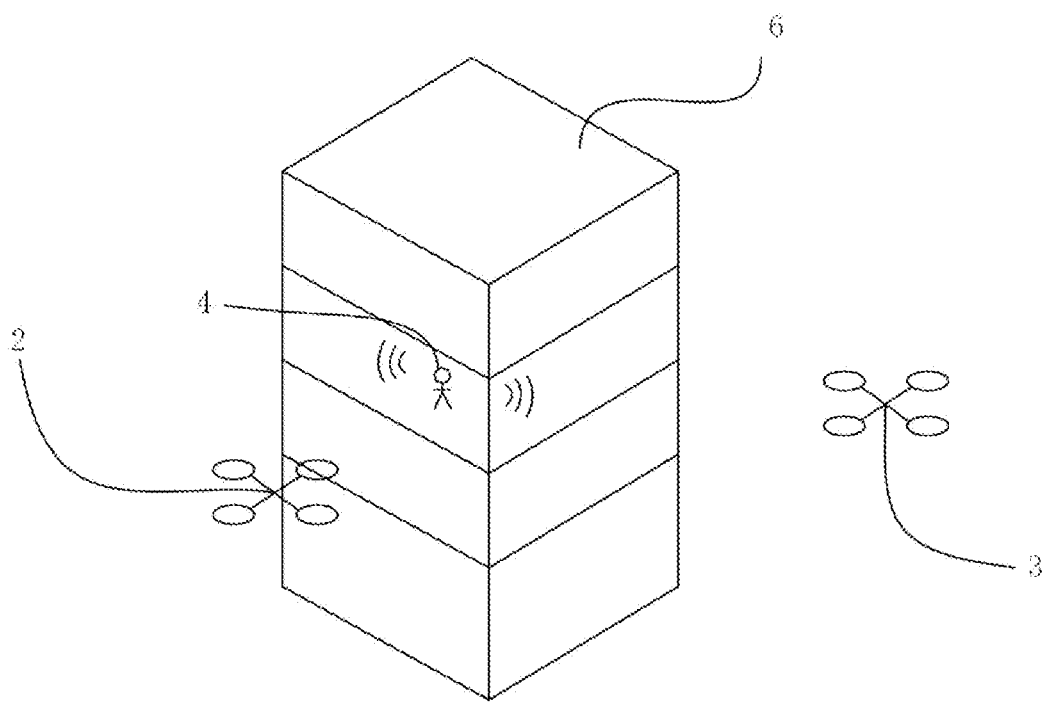

METHOD FOR POSITIONING TARGET IN BUILDING BASED ON ASSISTANCE OF TWO AIRCRAFT

CROSS REFERENCE TO THE RELATED APPLICATIONS

This application is based upon and claims priority to Chinese Patent Application No. 202110370968.3, filed on Apr. 7, 2021, the entire contents of which are incorporated herein by reference.

TECHNICAL FIELD

The present invention relates to a method for positioning a target in a building based on the assistance of two aircrafts, which belongs to the technical field of wireless positioning.

BACKGROUND

When there is an alarm, disaster or fire in a building (especially a high-rise building), the public security, emergency, fire and other departments need to position people entering the scene in real time.

The prior indoor positioning methods are mainly in the form of Wi-Fi, Bluetooth and ultra-wideband (UWB). Among them, the Wi-Fi and Bluetooth methods can utilize prior hardware such as mobile devices for positioning, but they have low positioning accuracy, and poor stability and anti-interference performance. The UWB method has a positioning accuracy of up to 10 cm-level. However, due to poor signal penetration performance, it needs to deploy many positioning base stations, and it requires the indoor target to carry a specific UWB tag. In general, the prior indoor positioning methods all need to deploy a large number of positioning base stations indoors in advance, and have special requirements for the carried positioning devices. However, the indoor positioning base stations will become unusable due to damage in the event of a disaster.

In addition, the prior outdoor target positioning methods are mainly achieved through the global navigation satellite system (GNSS), but GNSS signals are almost unavailable indoors due to building shielding, resulting in difficulties in indoor positioning.

SUMMARY

The technical problem to be solved by the present invention is to provide a method for positioning a target in a building based on the assistance of two aircrafts.

In order to solve the above technical problem, the present invention provides the following technical solution: a method for positioning a target in a building based on assistance of two aircrafts, where the two aircrafts are respectively denoted as a first aircraft and a second aircraft; the first aircraft is provided with a first GNSS positioning device, a first direction-finding device and a first barometer; the second aircraft is provided with a second GNSS positioning device and a second direction-finding device; the first direction-finding device and the second direction-finding device are one-dimensional (1D) direction-finding devices; the indoor target carries a positioning tag and a second barometer; and the method includes the following steps:

allowing the first aircraft and the second aircraft to fly around the building, and sending a signal by the positioning tag; obtaining position coordinates $A_1=(x_1, y_1, z_1)$ of the first aircraft in real time by the first GNSS positioning device; and obtaining position coordinates $A_2=(x_2, y_2, z_2)$ of the second aircraft in real time by the second GNSS positioning device;

receiving, by the first direction-finding device, the signal sent by the positioning tag, and measuring a yaw angle in a direction of the signal source as $a_1$; according to the position coordinates $A_1=(x_1, y_1, z_1)$ of the first aircraft, obtaining projection of a connecting line between the first aircraft and the indoor target on a horizontal plane to be denoted as a first projection line; similarly, receiving, by the second direction-finding device, the signal sent by the positioning tag, and measuring a yaw angle in a direction of the signal source as $a_2$; and according to the position coordinates $A_2=(x_2, y_2, z_2)$ of the second aircraft, obtaining projection of a connecting line between the second aircraft and the indoor target on the horizontal plane to be denoted as a second projection line; and assuming that position coordinates of the indoor target are $A_d=(x_d,y_d,z_d)$, calculating an intersection of the first projection line and the second projection line as $(x_d, y_d)$; measuring, by the first barometer, a barometric pressure at a position of the first aircraft as $p_1$, and measuring, by the second barometer, a barometric pressure at a position of the indoor target as $P_d$; and according to the position coordinates of the first aircraft, a principle that the barometric pressure decreases by 100 $P_a$ for every 9 meters rise, and a difference between the two barometric pressures, obtaining an altitude $z_d$ of the indoor target to further obtain the position coordinates of the indoor target.

The present invention has the following advantages. In the present invention, two aircrafts are used to assist in positioning the target in the building without deploying an indoor positioning base station. Compared with positioning by prior hardware such as mobile devices, the present invention improves the positioning accuracy, stability and anti-interference performance. Even at disaster sites such as fires, the present invention can still accurately position indoor targets such as on-site personnel, thereby improving safety.

BRIEF DESCRIPTION OF THE DRAWINGS

FIGURE is a schematic view of an embodiment of the present invention.

Reference Numerals: 2. first aircraft; 3. second aircraft; 4. indoor target; and 6. building.

DETAILED DESCRIPTION OF THE EMBODIMENTS

Embodiment

As shown in FIGURE, in the present embodiment, two aircrafts are used to assist in positioning an indoor target. The two aircrafts are denoted as the first aircraft 2 and the second aircraft 3 respectively. The first aircraft 2 is provided with a first GNSS positioning device configured to measure a position of the first aircraft in real time, a first direction-finding device, and a barometer configured to measure a barometric pressure at the position of the first aircraft in real time. The second aircraft 3 is provided with a second GNSS positioning device configured to measure a position of the second aircraft in real time, and a second direction-finding device. The first direction-finding device and the second direction-finding device may be 1D direction-finding devices or two-dimensional (2D) direction-finding devices.

When the 2D direction-finding devices are used, only measured yaw angles are used, and pitch angles are discarded.

The first aircraft and the second aircraft may be unmanned aerial vehicles (UAVs) or manned helicopters. They are preferably UAVs to position the indoor target, which are more convenient and safer to operate.

Because the radio signal radiation is directional, the direction of the radio signal radiation source can be determined by the direction-finding device. In the present embodiment, the first aircraft 2 and the second aircraft 3 separately carry one 1D direction-finding device. The 1D direction finding device can measure the yaw angle in the direction of the signal source by using an amplitude comparison method, a Doppler method, a phase interference method, a correlation interference method or a time difference of arrival (TDOA) method. This belongs to the prior art, which can refer to related documents, and will not be repeated here. The 1D direction-finding devices and the antenna systems thereof can refer to "*Design of Shortwave Direction Finding Processor Based on Wasson-Watt Principle*" (Wang Baorui et al., Chinese Journal of Scientific Instrument, 2010, 31(8): 313-317).

The indoor target 4 carries a second barometer configured to measure a barometric pressure at a position of the indoor target 4. There are two types of positioning tags: a non-cooperative positioning tag and a cooperative positioning tag. The cooperative positioning tag can only transmit wireless signals that are not encoded, that is, it can transmit radio signals on any single frequency point, similar to an interphone. Therefore, it can only be used to detect the signal direction. When the barometric pressure measured by the second barometer is transmitted, it is necessary to transmit the barometric pressure to a data processing terminal through other prior communication methods. A signal modulation function is added in the cooperative positioning tag on the basis the non-cooperative positioning tag. First, the positioning tag is connected to the second barometer, so that information such as an identification (ID) and the barometric pressure can be modulated and encoded in the signal transmitted by the positioning tag. The first direction-finding device and the second direction-finding device have the corresponding signal demodulation function, and the measured barometric pressure can be directly received by the first direction-finding device and the second direction-finding device. Then, the first direction-finding device and the second direction-finding device transmit relevant data to the data processing terminal, which is more convenient for management. Therefore, in the present embodiment, the cooperative positioning tag is preferably used. Both modulation and demodulation of signals belong to the prior art, which will not be repeated here.

In the present embodiment, the method for positioning a target in a building based on the assistance of two aircrafts includes the following steps:

The first aircraft 2 and the second aircraft 3 fly around the building 6, and the positioning tag sends a signal. The first GNSS positioning device obtains position coordinates $A_1=(x_1, y_1, z_1)$ of the first aircraft in real time, and sends the position coordinates $A_1=(x_1, y_1, z_1)$ to the data processing terminal. The second GNSS positioning device obtains position coordinates $A_2=(x_2, y_2, z_2)$ of the second aircraft in real time, and sends the position coordinates $A_2=(x_2, y_2, z_2)$ to the data processing terminal.

The first direction-finding device receives the signal sent by the positioning tag, and the first direction-finding device measures a yaw angle $\alpha_1$ in a direction of the signal source, and sends the yaw angle $\alpha_1$ to the data processing terminal.

According to the position coordinates $A_1=(x_1, y_1, z_1)$ of the first aircraft, the data processing terminal obtains projection of a connecting line between the first aircraft and the indoor target on a horizontal plane, which is denoted as a first projection line. Similarly, the second direction-finding device receives the signal sent by the positioning tag, and the second direction-finding device measures a yaw angle $\alpha_2$ in a direction of the signal source, and sends the yaw angle $\alpha_2$ to the data processing terminal. According to the position coordinates $A_2=(x_2, y_2, z_2)$ of the second aircraft, the data processing terminal obtains projection of a connecting line between the second aircraft and the indoor target on the horizontal plane, which is denoted as a second projection line.

Assuming that position coordinates of the indoor target are $A_d=(x_d, y_d, z_d)$, an intersection of the first projection line and the second projection line is calculated as $(x_d, y_d)$. In a specific implementation, the intersection $(x_d, y_d)$ is calculated as follows:

Letting $k_1=\tan(\alpha_1)$, then a point-slope equation of the first projection line is $y=k_1 (x-x_1)$. Letting $k_2=\tan(\alpha_2)$, then a point-slope equation of the second projection line is $y-y_2=k_2 (x-x_2)$.

Thus, the coordinates of the intersection of the first projection line and the second projection line are obtained as $(x_d, y_d)$, where $x_d=(b_2-b_1)/(k_2-k_1)$, $Y_d=k_1(x_d-x_1)+y_1$, $b_1=-k_1x_1+y_1$, and $b_2=-k_2x_2+y_2$.

The first barometer measures a barometric pressure $P_1$ at the position of the first aircraft, and sends the barometric pressure $P_1$ to the data processing terminal. The second barometer measures a barometric pressure $P_d$ at the position of the indoor target, and sends the barometric pressure $P_d$ to the data processing terminal. According to the principle that the barometric pressure decreases by 100 $P_a$ for every 9 meters rise, the difference between the two barometric pressures and the position coordinates of the first aircraft, the data processing terminal obtains an altitude $z_d$ of the indoor target to further obtain the position coordinates $(x_d, y_d, z_d)$ of the indoor target, thereby completing the positioning of the indoor target.

In the present embodiment, various data measured by the first aircraft, the second aircraft and the positioning tag of the indoor target are transmitted to the data processing terminal (preferably in a wireless transmission mode), and the data processing terminal performs positioning operations.

What is claimed is:

1. A method for positioning a target in a building based on assistance of two aircrafts, wherein the two aircrafts are respectively denoted as a first aircraft and a second aircraft; the first aircraft is provided with a first global navigation satellite system (GNSS) positioning device, a first direction-finding device and a first barometer; the second aircraft is provided with a second GNSS positioning device and a second direction-finding device; the indoor target carries a positioning tag and a second barometer; and the method comprises the following steps:

allowing the first aircraft and the second aircraft to fly around the building, and sending a signal by the positioning tag;

obtaining position coordinates $A_1=(x_1, y_1, z_1)$ of the first aircraft in real time by the first GNSS positioning device;

obtaining position coordinates $A_2=(x_2, y_2, z_2)$ of the second aircraft in real time by the second GNSS positioning device;

receiving, by the first direction-finding device, the signal sent by the positioning tag, and measuring a yaw angle in a direction of the signal source as $\alpha_1$;

according to the position coordinates $A_1=(x_1, y_1, z_1)$ of the first aircraft, obtaining projection of a connecting line between the first aircraft and the indoor target on a horizontal plane to be denoted as a first projection line;

receiving, by the second direction-finding device, the signal sent by the positioning tag, and measuring a yaw angle in a direction of the signal source as $\alpha_2$;

according to the position coordinates $A_2=(x_2, y_2, z_2)$ of the second aircraft, obtaining projection of a connecting line between the second aircraft and the indoor target on the horizontal plane to be denoted as a second projection line;

assuming that position coordinates of the indoor target are $A_d=(x_d, y_d, z_d)$, calculating an intersection of the first projection line and the second projection line as $(x_d, y_d)$;

measuring, by the first barometer, a first barometric pressure at a position of the first aircraft as $p_1$, and measuring, by the second barometer, a second barometric pressure at a position of the indoor target as $P_d$; and according to the position coordinates of the first aircraft, a principle that the barometric pressure decreases by 100 $P_a$ for every 9 meters rise, and a difference between the first barometric pressure and the second barometric pressure, obtaining an altitude $z_d$ of the indoor target to further obtain the position coordinates of the indoor target.

2. The method for positioning the target in the building based on the assistance of the two aircrafts according to claim 1, wherein the intersection $(x_d, y_d)$ is calculated as follows:

letting $k_1=\tan(\alpha_1)$, then a point-slope equation of the first projection line is $y-y_1=k_1(x-x_1)$;

letting $k_2=\tan(\alpha_2)$, then a point-slope equation of the second projection line is $y-y_2=k_2(x-x_2)$; and thus, coordinates of the intersection of the first projection line and the second projection line are obtained as $(x_d, y_d)$, wherein $x_d=(b_2-b_1)/(k_2-k_1)$, $y_d=k_1(x_d-x_1)+y_1$, $b_1=-k_1x_1+y_1$, and $b_2=-k_2x_2+y_2$.

3. The method for positioning the target in the building based on the assistance of the two aircrafts according to claim 1, wherein the first aircraft and the second aircraft are unmanned aerial vehicle (UAVs) or manned helicopters.

4. The method for positioning the target in the building based on the assistance of the two aircrafts according to claim 1, wherein the positioning tag is connected to the second barometer; the positioning tag has a signal modulation function, and the second barometric pressure measured by the second barometer is modulated in the signal sent by the positioning tag; and each of the first direction-finding device and the second direction-finding device has a corresponding signal demodulation function.

5. The method for positioning the target in the building based on the assistance of the two aircrafts according to claim 1, wherein the first direction-finding device and the second direction-finding device measure the yaw angle in the direction of the signal source by using an amplitude comparison method, a Doppler method, a phase interference method, a correlation interference method or a time difference of arrival (TDOA) method.

6. The method for positioning the target in the building based on the assistance of the two aircrafts according to claim 1, wherein the first direction-finding device and the second direction-finding device are one-dimensional (1D) direction-finding devices.

7. The method for positioning the target in the building based on the assistance of the two aircrafts according to claim 2, wherein the first aircraft and the second aircraft are unmanned aerial vehicle (UAVs) or manned helicopters.

8. The method for positioning the target in the building based on the assistance of the two aircrafts according to claim 2, wherein the positioning tag is connected to the second barometer; the positioning tag has a signal modulation function, and the second barometric pressure measured by the second barometer is modulated in the signal sent by the positioning tag; and each of the first direction-finding device and the second direction-finding device has a corresponding signal demodulation function.

9. The method for positioning the target in the building based on the assistance of the two aircrafts according to claim 2, wherein the first direction-finding device and the second direction-finding device measure the yaw angle in the direction of the signal source by using an amplitude comparison method, a Doppler method, a phase interference method, a correlation interference method or a time difference of arrival (TDOA) method.

10. The method for positioning the target in the building based on the assistance of the two aircrafts according to claim 2, wherein the first direction-finding device and the second direction-finding device are one-dimensional (1D) direction-finding devices.

* * * * *